United States Patent
Gupta et al.

(10) Patent No.: US 10,311,083 B2
(45) Date of Patent: *Jun. 4, 2019

(54) SEARCH AND ANALYTICS FOR STORAGE SYSTEMS

(71) Applicant: Cohesity, Inc., Santa Clara, CA (US)

(72) Inventors: Apurv Gupta, Bangalore (IN); Vipin Gupta, San Jose, CA (US); Johnny Chen, Santa Clara, CA (US); Sunil Moolchandani, Santa Clara, CA (US); Murali Vajapeyam, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,373

(22) Filed: Apr. 6, 2018

(65) Prior Publication Data

US 2018/0225349 A1 Aug. 9, 2018

Related U.S. Application Data

(63) Continuation of application No. 14/624,357, filed on Feb. 17, 2015, now Pat. No. 9,971,821.

(51) Int. Cl.
| | | |
|---|---|---|
| *G06F 16/00* | (2019.01) | |
| *G06F 16/27* | (2019.01) | |
| *G06F 9/54* | (2006.01) | |

(52) U.S. Cl.
CPC ............ *G06F 16/27* (2019.01); *G06F 9/54* (2013.01)

(58) Field of Classification Search
CPC .................................................. G06F 21/604

USPC ........................................ 707/654, 661, 741
See application file for complete search history.

(56) References Cited

U.S. PATENT DOCUMENTS

| | | | |
|---|---|---|---|
| 7,669,026 B2 | 2/2010 | Boss | |
| 8,073,863 B2 | 12/2011 | Rachmiel | |
| 8,510,271 B1 | 8/2013 | Tsaur | |
| 9,384,254 B2* | 7/2016 | Tekade | G06F 11/1461 |
| 9,495,435 B2* | 11/2016 | Zhang | G06F 11/1461 |
| 9,563,683 B2* | 2/2017 | Abercrombie | G06F 12/0253 |
| 9,665,437 B2* | 5/2017 | Bhargava | G06F 11/1451 |
| 9,754,005 B2* | 9/2017 | Potter | G06F 11/1461 |
| 9,904,603 B2* | 2/2018 | Mutalik | G06F 11/1451 |
| 2006/0230066 A1 | 10/2006 | Kosov | |
| 2007/0185914 A1 | 8/2007 | Prahlad | |
| 2008/0195651 A1 | 8/2008 | Rachmiel | |
| 2010/0082553 A1 | 4/2010 | Beatty | |
| 2011/0106764 A1 | 5/2011 | Wu | |
| 2012/0030180 A1 | 2/2012 | Klevenz | |
| 2014/0344216 A1 | 11/2014 | Abercrombie | |
| 2014/0351214 A1 | 11/2014 | Abercrombie | |
| 2014/0358935 A1 | 12/2014 | Prahlad | |
| 2015/0142745 A1* | 5/2015 | Tekade | G06F 11/1451 707/646 |
| 2015/0142748 A1* | 5/2015 | Gottemukkula | G06F 11/1451 707/649 |

(Continued)

*Primary Examiner* — Hanh B Thai
(74) *Attorney, Agent, or Firm* — Van Pelt, Yi & James LLP

(57) ABSTRACT

Application-level data in a storage system are evaluated. For example, a backup analysis tool retrieves a backup object stored in the storage system. The backup analysis tool reconstructs an application object from the backup object. The backup analysis tool accesses the first application object according to a native application format associated with the first object.

20 Claims, 6 Drawing Sheets

(56) References Cited

U.S. PATENT DOCUMENTS

2015/0142750 A1* 5/2015 Mutalik ............. G06F 11/1451
707/654
2015/0143063 A1* 5/2015 Mutalik ............. G06F 11/1451
711/162
2016/0077972 A1 3/2016 Pease

* cited by examiner

SEARCH AND ANALYTICS FOR STORAGE SYSTEMS

CROSS REFERENCE TO OTHER APPLICATIONS

This application is a continuation of co-pending U.S. Patent application Ser. No. 14/624,357 entitled SEARCH AND ANALYTICS FOR STORAGE SYSTEMS filed Feb. 17, 2015 which is incorporated herein by reference for all purposes.

BACKGROUND

Field

Embodiments presented herein provide software tools used to evaluate data stored in a backup storage system. More specifically, embodiments presented herein provide techniques for evaluating application-level data in a storage system.

Description of the Related Art

A distributed computing system includes multiple computer systems which interact with one another to achieve a common goal. Often, the computer systems are networked to form a cluster. Computer systems in the cluster may share different resources, such as data, storage, processing power, and the like. A secondary storage system is one such example. A cluster of secondary storage systems may provide services for primary storage systems. For instance, secondary storage systems may provide backup, copy, and test and development services for data residing in a primary storage system. Further, a secondary storage system may store multiple versions of an object, such as a virtual disk, a database, a file, etc. The secondary storage system may use its own encoding and storage formats to store each backup.

An enterprise may want to access application data (e.g., a file, document, content, database records, etc.) stored in the secondary storage system. For example, to comply with law, regulation, or policy, it may be necessary to remove specific content (e.g., pirated multimedia) from the primary storage system. Since the secondary storage system may store additional copies of such content in multiple snapshots, the enterprise needs to remove that content stored in the secondary storage system. To do so, the administrator may need to evaluate each backup of the primary storage system that could include the content. However, the format of each backup may have a distinct structure at multiple levels. For instance, an application may have a specific format, e.g., some kind of archive. Further, the secondary storage system creates its own structure for backup, e.g., a snapshot of a storage state. To remove the content of a given application, the enterprise would need to go into each snapshot and into the particular format of the application.

SUMMARY

One embodiment presented herein describes a method for evaluating application-level data in a secondary storage system storing backup data for a primary storage system. The method generally includes retrieving a first backup object stored in the secondary storage system. A first application object is reconstructed from the first backup object. The first application object is accessed according to a native application format associated with the first object.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
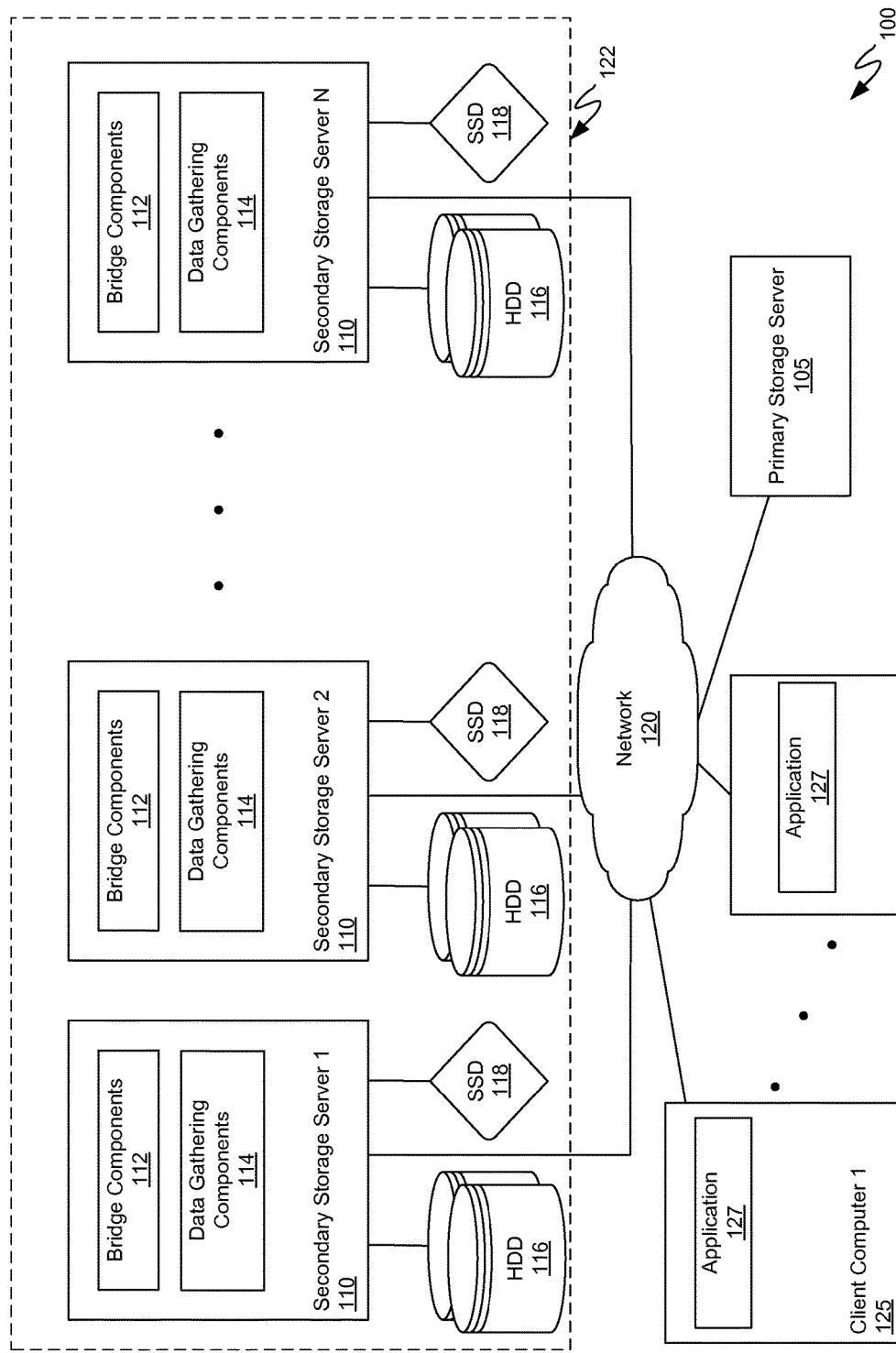
FIG. 1 illustrates an example computing environment, according to one embodiment.

Embodiments presented herein describe techniques for evaluating application-level data which may be stored in (or at least referenced by) multiple backup copies, referred to as snapshots, of a primary storage system maintained by a secondary storage system. Each snapshot provides a backup of a system state at a given point of time. Each successive snapshot may capture changes to the system following a previous snapshot. Further, in some systems, successive snapshots might not capture an entire data set, but rather only changes made after the prior snapshot. In such a case, the secondary storage system may reconstruct a full backup by referring back to each previous snapshot as needed. Each snapshot has its own encoding and storage format for a backup object. Further, each object captured in a snapshot (e.g., files of a file system) maintains its own encoding and storage format.

A secondary storage system may capture backups of a database, a virtual machine disk, a file, etc. In one embodiment, a backup analysis tool may "pierce" a given backup to reveal object content using an application programming interface (API) associated with a particular application. For example, a backup may store a virtual machine disk for a virtual machine. The virtual machine disk in turn may store a set of application files (e.g., productivity applications, e-mail applications, etc.) and application data or files (e.g., documents, images, messages, etc.). In addition to APIs, the backup analysis tool may use other tools that have famiiarity with the structure of an object to pierce the backup (e.g., third party tools, tools associated with the secondary storage system, and the like).

In one embodiment, the analysis tool reconstructs an object from a given snapshot. The backup analysis tool then interprets the object using the appropriate API. The backup analysis tool may determine structure, metadata, content, and other relevant information for the backup by using the APIs to interact with the object as a native object of the corresponding application.

Doing so allows the storage system to search and analyze the backup at an application level. That is, the backup analysis tool can pierce the encoding format and structure used by the secondary storage system to obtain an application level object (e.g., a virtual machine disk image, an individual e-mail message, a row or table from a database file, and so on). Once obtained, an application API is used to interpret that object. In this example, an API could be used to interpret the backup object as a disk image in order to identify a set of files associated with a given application. Note, this allows for a evaluation of arbitrarily nested content stored by the secondary storage system, such as a virtual machine disk image nested within another virtual machine disk image. Thus, once a given set of files are identified (e.g., files associated with a word processor application) additional API's can be used to interpret these objects in their native format.

This approach allows an enterprise to evaluate multiple snapshots captured by the secondary storage system in a variety of situations. For example, assume that an enterprise maintains a secondary storage system that stores multiple backups of primary storage at different points in time. And that for regulatory compliance, the enterprise wishes to ensure that social security numbers (SSN) are scrubbed from stored documents held by the enterprise (whether in primary or secondary storage). Because multiple backups of the primary storage system exist, the backup analysis tool should ensure that any SSNs are not captured in the backups. Such techniques may also apply in purging other types of data from the secondary storage system at a granular level, e.g., copyrighted materials for which the enterprise no longer possesses rights, illicit and unlawful multimedia, and the like.

To do so, the backup analysis tool can pierce each backup by reconstructing an object captured or represented by the backup. For example, the backup may be of a virtual machine disk object of the primary storage system. The backup analysis tool can then interpret the structure of the virtual machine disk object using a respective API. Doing so allows the backup analysis tool to natively evaluate of the virtual machine disk object, i.e., as a collection of directories and files. Each file may be associated with a distinct application. The backup analysis tool may continue to interpret each file using a respective API until the backup analysis tool reaches a document to be evaluated. In this case, an object storing application level content may be evaluated to determine whether that object (e.g., a word processing file) includes any social security numbers. If so, the secondary storage system can modify the document to remove the content using the APIs. In this example, the content could be removed or replaced with substitute characters (e.g., "XXX-XX-XXXX") and saved. To do so, APIs used by the word processing tool would write the file back to the virtual disk object, which, in turn, would be written to the backup object using APIs associated with the virtual machine disk object.

Further, piercing backups allows an enterprise to perform any manner of search or analytics against data stored by the secondary storage system. For example, the backup analysis tool can build an index of application-level objects, such as customer databases, spreadsheets, word processor documents, etc. A search application can identify objects maintained in storage system using the index. Further, such techniques allow a restore application to restore objects at the application-level. Continuing the virtual machine disk object example, the virtual machine disk object can have multiple versions. In addition, the backup analysis tool may reconstruct an instance of a given application-level object in each version of the virtual disk. A user may choose to restore an application-level object from a previous version of the virtual disk without having to roll back the entire virtual machine disk object to do so.

As another example, the backup analysis tool can evaluate changes to an object over time. Continuing the virtual machine disk object example, the backup analysis tool can track various edits to a given file in the virtual disk by evaluating different versions of the virtual machine disk object. In addition, the backup analysis tool can evaluate file metadata, e.g., who modified the file between backups, who accessed the file, when the file was accessed, etc. Further, because the backup analysis tool may track an object over time, the backup analysis tool can perform data forensics, e.g., by identifying points in time in the event an object is affected by viruses, malware, and the like. Similarly, the backup analysis tool may track the spread of a virus throughout the file system through object histories.

Piercing objects using APIs associated with an application allow the secondary storage system to identify semantically relevant information about such objects. Advantageously, search and analysis applications can use the information for different purposes, e.g., identifying sensitive data in documents, tracking edits to a file over time, and performing data integrity checks on application-level data.

Note, the following description uses a distributed secondary storage system as a reference example of a storage system that identifies semantically relevant information about application-level objects. However, one of ordinary skill in the art will recognize that embodiments may be adapted to a variety of storage systems that store multiple versions of a given object (e.g., virtual disks, databases, documents, etc.).

FIG. 1 illustrates an example computing environment 100, according to one embodiment. As shown, the computing environment includes a primary storage server 105 and a cluster 122. As shown, the cluster 122 includes multiple computing servers 110 that host and manage a distributed service (e.g., secondary storage services). The primary storage server 105 and secondary storage servers 110 are each connected via a network 120. The primary storage server 105 and secondary storage servers 110 may provide storage for a data center.

In particular, the cluster 122 of secondary storage servers 110 form a distributed file system which provides backup storage and services to the primary storage server 105. Illustratively, each secondary storage server 110 (or "node") of the distributed file system includes bridge components 112 and data gathering components 114. The bridge components 112 may provide software applications that allow external clients to access each node. The data gathering components 114 are generally configured to retrieve data from primary storage server 105 (e.g., by communicating with the primary storage server 105 using a backup protocol). Further, each node includes one or more hard disk drives (HDDs) 116 and solid-state drives (SSDs) 118 for storing data from primary storage server 105. The SSDs 118 increase the performance running secondary storage transactions, such as serial-write transactions. In one embodiment, the distributed file system is the SnapFS® developed by Cohesity, Inc.

In one embodiment, distributed cluster 122 may expose backup data to applications 127 on clients 125. For example, assume the distributed cluster 122 provides a backup of a file system on the primary storage server 105. In such a case, the cluster 122 could create a snapshot of a file system on the primary storage server 105 every few minutes. Further, the cluster 122 could expose a clone of one of the snapshots to applications 127. For example, the cluster 122 could export a clone as an NFS mount point (or SMB, CIFS, etc.), allowing the clients 125 to mount the snapshot over a directory in the local file system of the client 125. In such a case, the bridge components 112 may respond to requests from clients 125 to perform NFS operations (or operations for SMB, CIFS, etc.) on the mounted directory (e.g., lookup, create, read, write, rename, remove, etc.).

Figure 2:
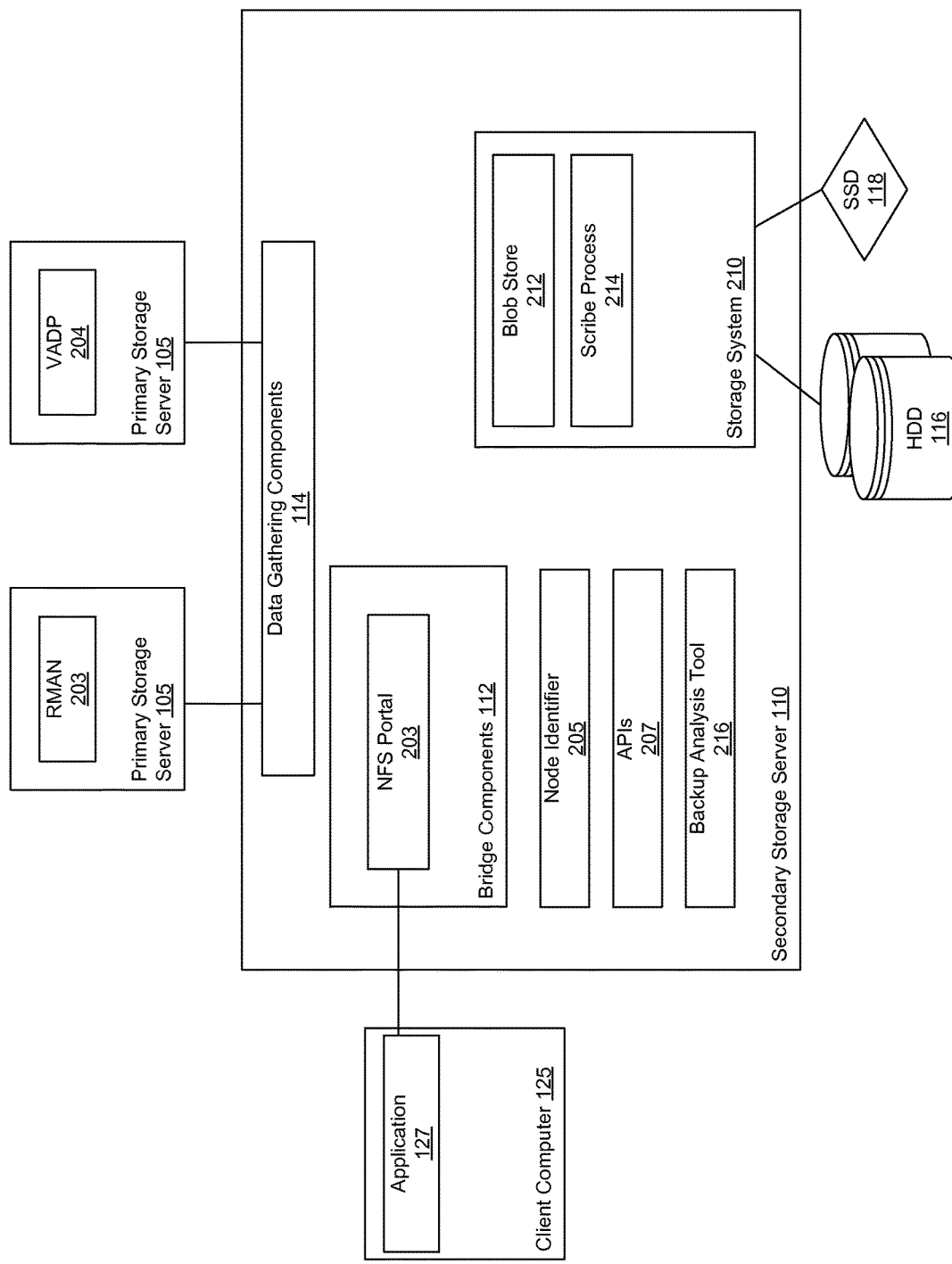
FIG. 2 illustrates an example secondary storage server configured to manage backup data for search and analysis, according to one embodiment.

FIG. 2 further illustrates a secondary storage server 110, according to one embodiment. As shown, the secondary storage server 110 includes bridge components 112, data gathering components 114, a node identifier 205, and APIs 207. The node identifier 205 is a distinct value that may be based on the MAC address of the secondary storage server 110. The APIs 207 are interfaces that allow the secondary storage server 110 to interpret backup data at application-level.

As stated, the data gathering components 114 communicate with primary storage servers in the computing environment 100. Illustratively, the data gathering components 114 may retrieve data from primary storage servers 201 and 202, where each primary storage server 201 and 202 execute backup protocols such as recovery manager (RMAN) 203 and vStorage APIs for Data Protection (VADP).

The secondary storage server includes a file system 210. The file system 210, in conjunction with the file systems of other secondary storage servers in the cluster, forms a distributed system used to store backup data from the primary storage services. Further, the secondary storage system may create each backup with its own format according to a backup object. For example, assume the bridge components 112 receive a virtual machine disk (VMDK) from the backup data gathering components 114. In such a case, the bridge components 112 write the VMDK to disk storage. In addition, file system metadata is stored in SSD 118. However, as a VMDK file can be quite large (e.g., terabytes), bridge components 112 may store the VMDK file as set of smaller blobs (binary large object) files managed by a blob manager, each having a set of chunks (e.g., approximately 8 KB each). Backup data below a given size threshold (e.g., files less than 256 K bytes) could be stored in the SSD 118 directly along with the file system metadata. Each blob is encoded according to a backup format of the secondary storage system.

Data in the secondary storage server 110 may be stored in distributed B+ trees or blob structures. In one embodiment, data smaller than 256 KB resides in distributed B+ trees, and data larger than 256 KB is stored in blob structures. The secondary storage server 200 may maintain a blob store 214 that contains the blob structures. Each blob may be divided into regions of a particular size, such as 1 MB. These regions, or "bricks," may further contain chunks of data that reference logical files in the SSD 118 and the HDDs 116.

In one embodiment, the scribe process 214 also maintains information about the chunks of data in the blob store 212 in key-value stores (e.g., tree structures). One example key-value store may map blob structures to brick sections. Another store may map bricks to chunks. Yet another store may map chunks to logical files storage drives of the secondary storage server 110.

In one embodiment, the secondary storage server 110 further includes a backup analysis tool 216. The backup analysis tool 216 accesses snapshots stored in the blob store 212. Further, the backup analysis tool 216 reconstructs objects from the backup data according to the backup format of the secondary storage system. The backup analysis tool 216 may interpret the contents of an object using the appropriate application level APIs 207 associated with that object. Doing so allows the backup analysis tool 216 to view backup data at an application level.

Further, the backup analysis tool 216 can then perform any needed analytics or search operations on the backup data at application level, according to the native format of the object. For example, the backup analysis tool 216 can evaluate a backup of a virtual machine disk object at to identify documents. Further, the backup analysis tool 216 may evaluate contents of each document (or other object) using APIs associated with the documents. Doing so allows the backup analysis tool 216 to evaluate the content of the documents to determine where the documents contain sensitive data, e.g., social security numbers, credit card numbers, and the like. As another example, the backup analysis tool 216 can build a searchable index of the documents or content of documents in the snapshot.

Figure 3:
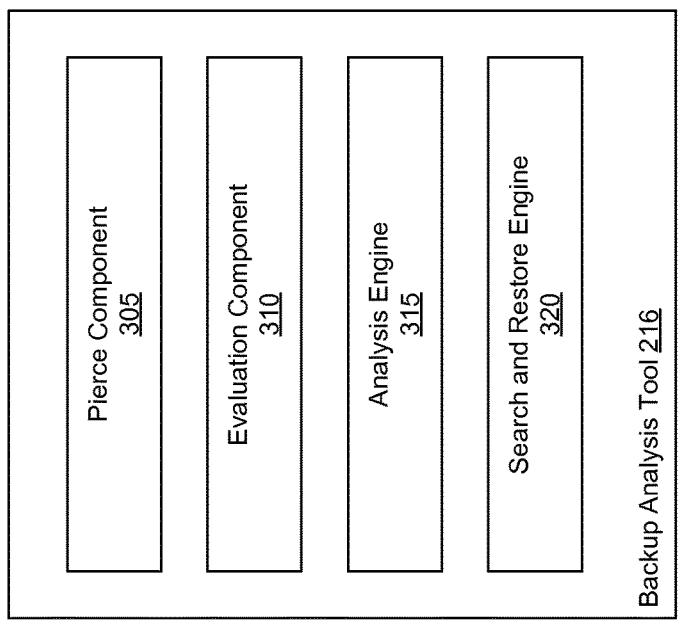
FIG. 3 further illustrates the storage application described relative to FIG. 2, according to one embodiment.

FIG. 3 further illustrates the backup analysis tool 216, according to one embodiment. The backup analysis tool 216 includes a pierce component 305, an evaluation component 310, an analysis engine 315, and a search and restore engine 320.

In one embodiment, the pierce component 305 may access a backup object maintained in the blob store 212. Further, the pierce component 305 may reconstruct an application level object from a backup. For example, assume that the secondary storage maintains a backup of a virtual machine disk object, e.g., a VMDK, in the blob store 212. The backup itself may be created based on a proprietary format of the secondary storage system. The pierce component 305 may reconstruct the VMDK from the backup format. To do so, the pierce component 305 accesses the key-value store maintained by the scribe process 214 to determine offsets of the VMDK object as stored in the blob store 212.

The VMDK encodes data using its own native format. As such, evaluation component 310 uses a VMDK API to interpret the structure and content of the VMDK. Doing so allows the evaluation component 310 to identify nested objects within the VMDK, such as directories, executables, and files (e.g., documents, spreadsheets, images, and the like). Further, the pierce component 305 and evaluation component 310 can access each object and identify contents of the object using a respective API. For example, the evaluation component 310 can interpret a database table using an API of the associated database, if available. As another example, the evaluation component 310 can interpret objects of word processing applications (e.g., documents), image editing applications (e.g., JPEGs, GIFs, etc.), and enterprise service applications (e.g., customer tables).

In one embodiment, the analysis engine 315 includes routines which invoke application level APIs against a given object reconstructed from a backup. Continuing the previous example, the analysis engine 315 may evaluate the database table for specific content. The analysis engine 315, based on a specified directive, can modify the content. For instance, assume that the analysis engine 315 executes a routine to locate and remove social security numbers in a comments field of a database table. The analysis engine 315 evaluates application-level data identified by the evaluation component 310, i.e., records in the comments table, to determine whether a given record includes a social security number. If so, the analysis engine 315 can remove the social security number from the record.

In one embodiment, the search and restore engine 320 includes various routines for locating multiple versions of an application-level object in the blob store 212. For example, the search and restore engine 320 may build a searchable index of a backup object, such as a VMDK. The index may include application-level objects within the VMDK. The index may also include multiple versions of a given application-level object in each snapshot, providing a history for the object at an application-level over time. An administrator may search through the index to view different versions of the object.

Further, the search and restore engine 320 also includes routines for rolling back an object to a specified version. In particular, the search and restore engine 320 may reconstruct an application-level object, such as a database table, from a previous version of a backup. The evaluation component 310 identifies various versions of the database table across multiple backups of a database object. An administrator may select a given version of the database table. In turn, the search and restore engine 320 may roll the database table to the selected version, without having to restore the entire backup of the database. The search and restore engine 320 may modify the snapshot to reflect the rollback of the database table.

Figure 4:
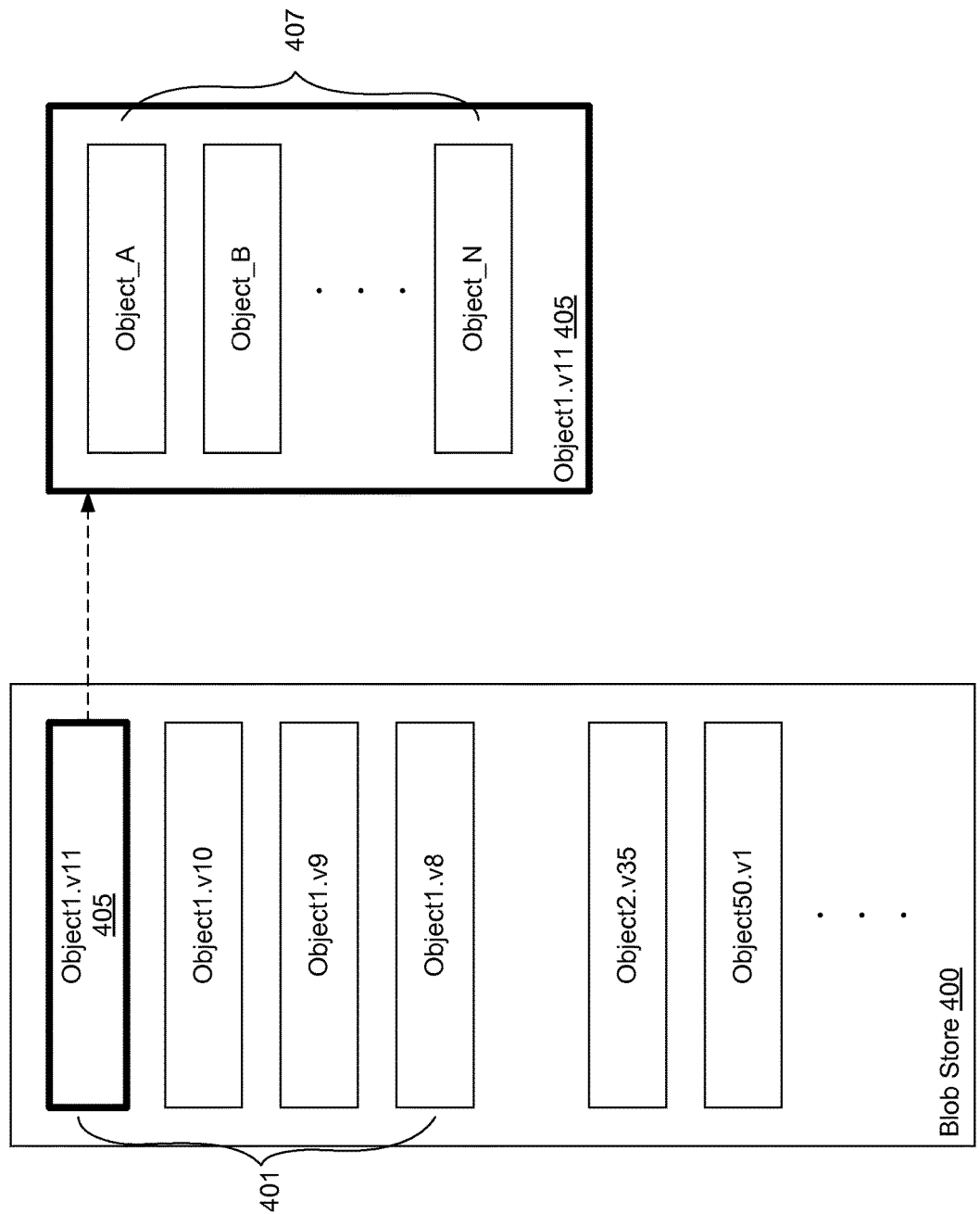
FIG. 4 illustrates an abstraction of a blob store in a secondary storage system, according to one embodiment.

FIG. 4 illustrates an example blob store 400 in a secondary storage system, according to one embodiment. Illustratively, the blob store 400 maintains multiple objects (e.g., Object1, Object2, Object50, and so on). Each object in the blob store 400 may represent a virtual machine disk object (e.g., a VMDK), an enterprise database, and the like. In addition, the blob store 400 may maintain multiple versions of a given object. As illustrated, the blob store 400 maintains eleven versions of Object1 400, as represented by the .v* following each iteration of Object1.

Each object itself may include multiple objects nested within. For example, Object1.v11 405 includes objects 407 (e.g., "Object_A," "Object_B," and so on). The objects 407 can be directories, binary executables, application-level files, and so on. Further, each of the objects 407 may include objects nested within that object as well. For instance, an object 407 can represent an application stored in the VMDK, such as a productivity application. The objects nested within the object 407 may be application-level data, such as documents, spreadsheets, and the like.

In one embodiment, the backup analysis tool 216 may pierce objects maintained in the blob store 400 to evaluate application-level data in the objects. The backup analysis tool 216 reconstructs the objects according to the formatting by the secondary storage system. Further, the backup analysis tool 216 interprets each object using an appropriate application-level API to interpret objects reconstructed from backup snapshots. Doing so allows the backup analysis tool 216 to identify application-level structure and content of each object.

Figure 5:
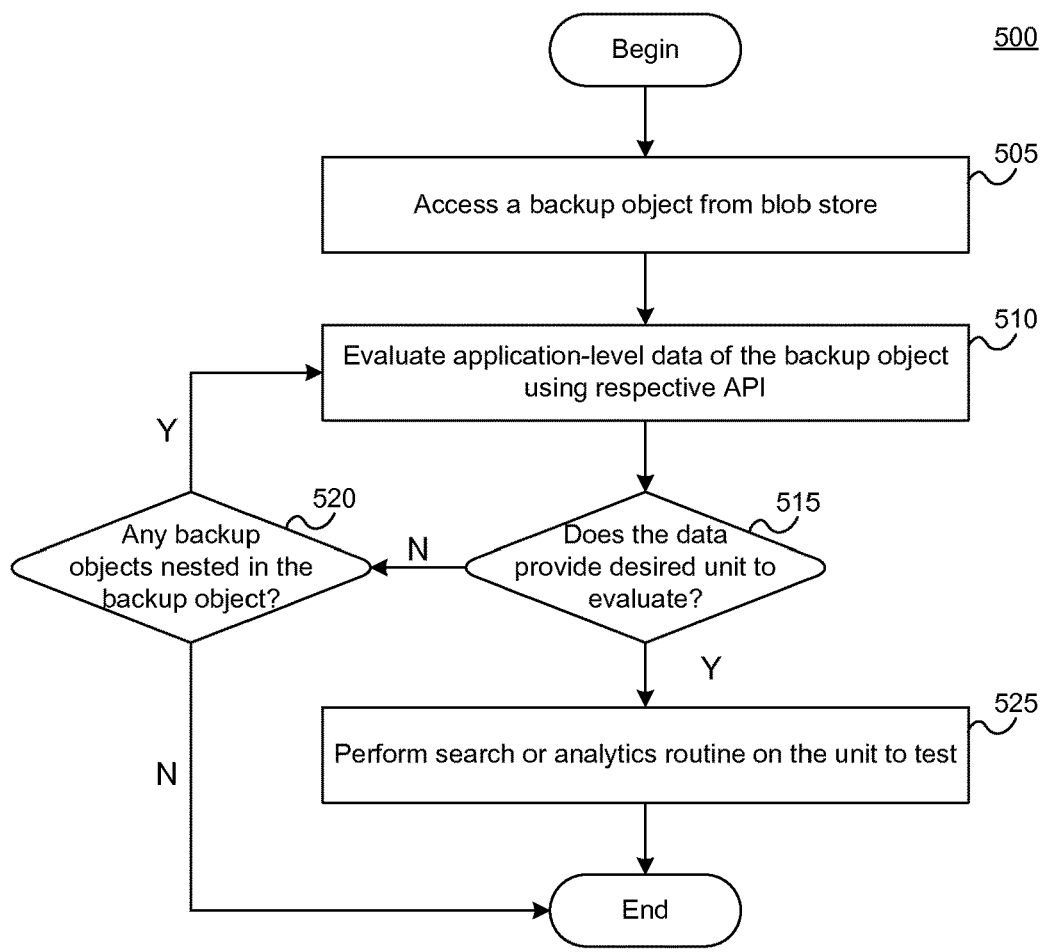
FIG. 5 illustrates a method for obtaining application-level information from a secondary storage system, according to one embodiment.

FIG. 5 illustrates a method 500 for evaluating application-level objects stored in snapshots of a secondary storage system, according to one embodiment. For example, assume that an enterprise desires to identify specific application-level content to remove from the secondary storage system, e.g., pirated multimedia files. Method 500 begins at step 505, where the pierce component 305 accesses a backup object from the blob store. As noted, the backup object may be a given snapshot of the primary storage system.

The pierce component 305 may reconstruct the object by determining, via the key-value stores maintained by the scribe process 214, offsets for the object in the blob store 212. The pierce component 305 extracts the object. At step 510, the evaluation component 510 interprets application-level data of the backup object using an API 207 associated with the backup object. Doing so allows the evaluation component 510 to identify structure and other content within the object. For example, assume that the backup object corresponds to a VMDK. The VMDK may include file directories, applications, and the like.

To access the content of the directories and applications, the backup analysis tool 216 needs to pierce the objects. At step 515, the evaluation component 510 determines whether the application-level data provides a desired unit to evaluate for the purpose of the task, e.g., for identifying pirated multimedia in the secondary storage system. If not, then at step 520, the evaluation component 520 determines whether any objects are nested in the backup object. If so, then method 500 returns to step 510, where the evaluation component 310 processes each backup object nested in that object. If no objects are nested, then method 500 ends.

Otherwise, the backup analysis tool 216 has access to the application level objects needed to perform the evaluation. At step 525, the analytics engine 325 may test the application-level objects to determine whether the object includes specified content (i.e., a pirated multimedia file). The analytics engine 325 may remove the specified content from the backup. Once complete, the search and restore engine 320 may modify the key-value table maintained by the scribe process 214 to reflect any changes.

Figure 6:
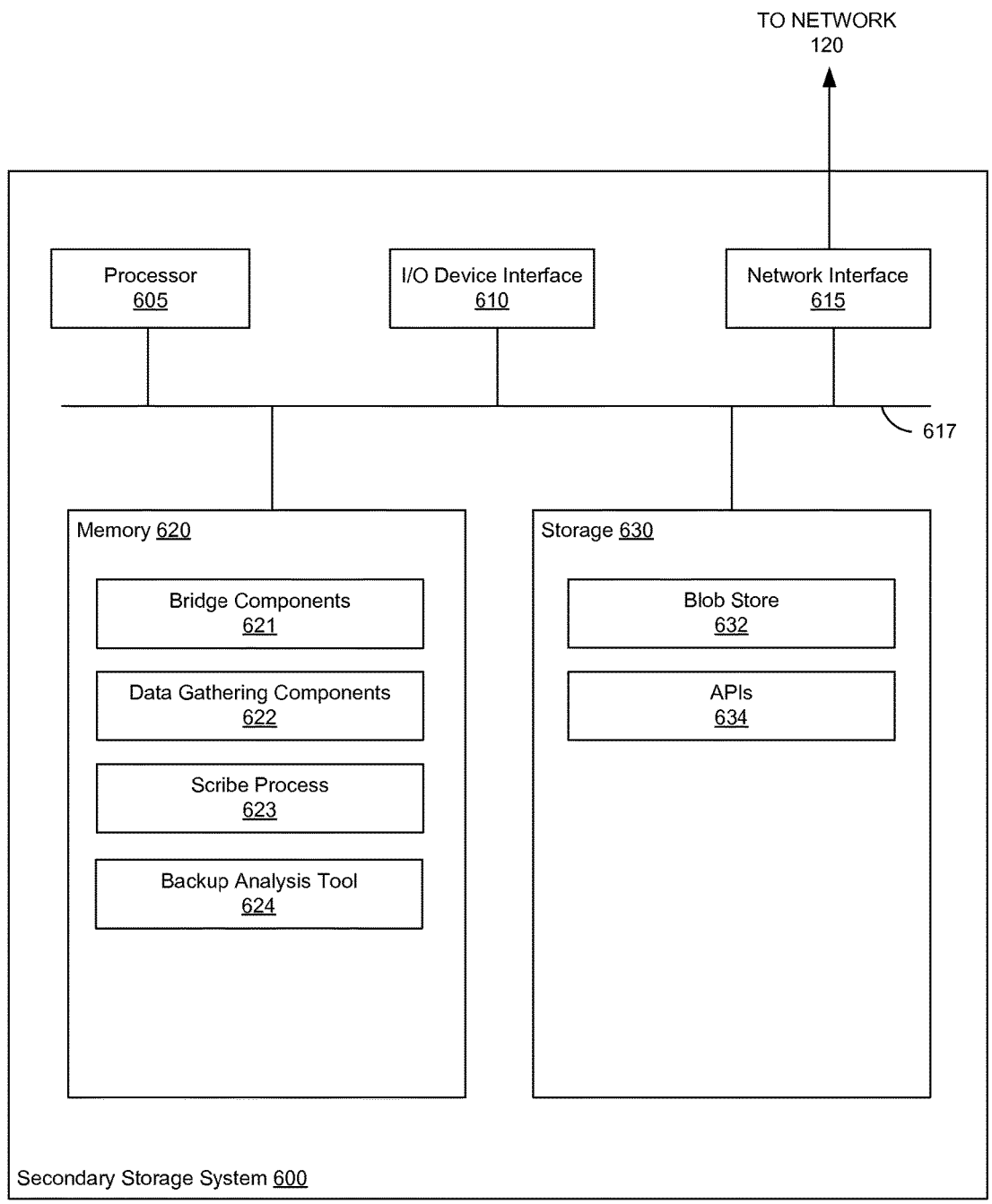
FIG. 6 illustrates an example secondary storage system, according to one embodiment.

FIG. 6 illustrates an example secondary storage system 600, according to one embodiment. As shown, system 600 includes, without limitation, a central processing unit (CPU) 605, a network interface 615, a memory 620, and storage 630, each connected to a bus 917. System 600 may also include an I/O device interface 610 connecting I/O devices 612 (e.g., keyboard, display and mouse devices) to the system 600. Further, in context of this disclosure, the computing elements shown in system 600 may correspond to a physical computing system (e.g., a system in a data center) or may be a virtual computing instance executing within a computing cloud.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes bridge components 621, data gathering components 622, a scribe process 623, and a backup analysis tool 624. And storage 630 includes a blob store 632 and APIs 634. The bridge components 624 provide a file system architecture for the distributed secondary storage system. The data gathering components 626 allow the secondary storage server 600 to communicate with primary storage servers and retrieve data from the primary storage servers.

In one embodiment, the scribe process 623 maintains information about the chunks of data in the blob store 632 in key-value stores (e.g., tree structures). One example key-value store may map blob structures to brick sections. Another store may map bricks to chunks.

In one embodiment, the backup analysis tool 624 accesses backups stored in the blob store 632. Further, the backup analysis tool 624 reconstructs objects from the backup data according to the formatting by the bridge processes. The backup analysis tool 624 may interpret the contents of the objects using APIs 634 associated with each given object. Doing so allows the backup analysis tool 624 to view backup data at an application level.

Further, the backup analysis tool 624 can then perform a number of analytics and search operations on the backup data at an application level. For example, the backup analysis tool 624 can evaluate a backup of a virtual machine disk object at application level to determine whether any documents contain sensitive data, e.g., social security numbers, credit card numbers, and the like. As another example, the backup analysis tool 624 can build an index of the backup that may be searched by an administrator.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
retrieving, by execution of one or more processors, a first backup object of a plurality of backup objects stored in a secondary storage system, wherein each backup object in the plurality represents a respective storage state associated with the secondary storage system at a respective point in time;
using the first backup object to perform a first level of reconstruction by reconstructing at least a portion of a full backup of a corresponding storage state associated with the first backup to obtain a reconstructed view of at least the portion of the full backup, wherein the first backup captures a snapshot since a previous backup using a B+ tree structure distributed among storage nodes of a distributed storage system;
performing a second level of reconstruction by reconstructing a first application object from at least the portion of the full backup reconstructed using the first backup object and the previous backup, wherein the first application object is nested in at least the portion of the full backup reconstructed using the first backup object, and the first level of reconstruction and the second level of reconstruction are performed to automatically and selectively access application level data encapsulated in at least the portion of the full backup reconstructed using the first backup object;
accessing the first application object according to a native application format associated with the first application object;
evaluating content stored by the first application object; and
modifying the first application object based on the evaluated content.

2. The method of claim 1, wherein accessing the first application object includes using an application programming interface (API) associated with the first application object.

3. The method of claim 1, wherein evaluating content stored by the first application object comprises:

identifying a second application object stored by the first application object; and accessing the second application object stored by the first application object according to a native application format associated with the second application object.

4. The method of claim 3, wherein modifying the first application object comprises:
identifying, based on the evaluation, specified content stored by the second application object; and
removing the specified content from the second application object.

5. The method of claim 3, wherein accessing the second application object comprises:
invoking an application programming interface (API) associated with the second application object.

6. The method of claim 1, wherein modifying the first application object comprises:
identifying, based on the evaluation, specified content stored by the first application object; and
removing the specified content from the first application object.

7. The method of claim 1, further comprising:
building an index of content stored by the first application object.

8. The method of claim 1, further comprising:
retrieving a second backup object of the plurality of backup objects stored in the secondary storage system;
reconstructing a second application object from the second backup object; and
replacing the first application object with the second application object in the first backup object.

9. A system, comprising:
a processor; and
a memory coupled with the processor, wherein the memory is configured to provide the processor with instructions which when executed cause the processor to:
retrieve, by execution of one or more processors, a first backup object of a plurality of backup objects stored in a secondary storage system, wherein each backup object in the plurality represents a respective storage state associated with the secondary storage system at a respective point in time;
use the first backup object to perform a first level of reconstruction by reconstructing at least a portion of a full backup of a corresponding storage state associated with the first backup to obtain a reconstructed view of at least the portion of the full backup, wherein the first backup captures a snapshot since a previous backup using a B+ tree structure distributed among storage nodes of a distributed storage system;
perform a second level of reconstruction by reconstructing a first application object from at least the portion of the full backup reconstructed using the first backup object and the previous backup, wherein the first application object is nested in at least the portion of the full backup reconstructed using the first backup object, and the first level of reconstruction and the second level of reconstruction are performed to automatically and selectively access application level data encapsulated in at least the portion of the full backup reconstructed using the first backup object;
access the first application object according to a native application format associated with the first application object;

evaluate content stored by the first application object; and
modify the first application object based on the evaluated content.

10. The system of claim 9, wherein accessing the first application object includes using an application programming interface (API) associated with the first application object.

11. The system of claim 9, wherein evaluating content stored by the first application object comprises:
identifying a second application object stored by the first application object; and
accessing the second application object stored by the first application object according to a native application format associated with the second application object.

12. The system of claim 11, wherein modifying the first application object comprises:
identifying, based on the evaluation, specified content stored by the second application object; and
removing the specified content from the second application object.

13. The system of claim 11, wherein accessing the second application object comprises:
invoking an application programming interface (API) associated with the second application object.

14. The system of claim 9, wherein modifying the first application object comprises:
identifying, based on the evaluation, specified content stored by the first application object; and
removing the specified content from the first application object.

15. The system of claim 9, wherein the memory is further configured to provide the processor with instructions which when executed cause the processor to build an index of content stored by the first application object.

16. The system of claim 9, wherein the memory is further configured to provide the processor with instructions which when executed cause the processor to:
retrieve a second backup object of the plurality of backup objects stored in the secondary storage system;
reconstruct a second application object from the second backup object; and
replace the first application object with the second application object in the first backup object.

17. A computer program product, the computer program product being embodied in a non-transitory computer readable storage medium and comprising computer instructions for:
retrieving, by execution of one or more processors, a first backup object of a plurality of backup objects stored in a secondary storage system, wherein each backup object in the plurality represents a respective storage state associated with the secondary storage system at a respective point in time;
using the first backup object to perform a first level of reconstruction by reconstructing at least a portion of a full backup of a corresponding storage state associated with the first backup to obtain a reconstructed view of at least the portion of the full backup, wherein the first backup captures a snapshot since a previous backup using a B+ tree structure distributed among storage nodes of a distributed storage system;
performing a second level of reconstruction by reconstructing a first application object from at least the portion of the full backup reconstructed using the first backup object and the previous backup, wherein the first application object is nested in at least the portion of the full backup reconstructed using the first backup object, and the first level of reconstruction and the second level of reconstruction are performed to automatically and selectively access application level data encapsulated in at least the portion of the full backup reconstructed using the first backup object;

accessing the first application object according to a native application format associated with the first application object;

evaluating content stored by the first application object; and modifying the first application object based on the evaluated content.

18. The computer program product of claim 17, wherein accessing the first application object includes using an application programming interface (API) associated with the first application object.

19. The computer program product of claim 17, wherein evaluating content stored by the first application object comprises:

identifying a second application object stored by the first application object; and accessing the second application object stored by the first application object according to a native application format associated with the second application object.

20. The computer program product of claim 17, wherein evaluating content stored by the first application object comprises:

identifying, based on the evaluation, specified content stored by the first application object; and removing the specified content from the first application object.

* * * * *